United States Patent Office 3,676,256
Patented July 11, 1972

---

3,676,256
BONDING METALS TO ELASTOMER SYSTEMS
Peter Aboytes, Borger, Tex., assignor to J. M. Huber Corporation, Locust, N.J.
No Drawing. Filed Nov. 18, 1970, Ser. No. 90,810
Int. Cl. B32b 15/06; B44d 1/34; C08c 11/18
U.S. Cl. 156—306                          1 Claim

ABSTRACT OF THE DISCLOSURE

Rubber vulcanizates reinforced with air oxidized treated furnace carbon blacks show improved adhesion to a surface of brass.

BACKGROUND OF THE INVENTION

In general, the present invention relates to rubber vulcanizate systems and in particular to the use of air oxidized furnace carbon blacks to produce improved adhesion of such systems to metallic surfaces.

The adhesion of vulcanizates to metallic wires used in belted tires has long been a major problem in the industry. The separation of the vulcanizate and the metallic belt wire is frequently observed.

The prior art has tried a number of the various grades of carbon black as reinforcing agents without successfully solving this problem. In addition, the prior art has attempted a wide variety of additional approaches to the problems of bonding elastomers and metals without having solved the problem to the industry's satisfaction. For an indication of some of the prior art approaches considered see, for example, U.S. Pats. 2,720,479; 3,054,712; 3,423,270; 3,425,886; 3,476,642; 3,480,508; and British Pat. 1,169,366.

In general, the industry has considered channel black to be the best product available in solving this problem.

As noted above, a number of other carbon blacks, including furnace blacks, both untreated and treated with modifying agents, have been tried as replacements for channel blacks in the solution of the elastomer-metal bonding problem. However, these blacks have uniformly resulted in elastomer-metal adhesion inferior to that produced by channel black. Since channel black represents the generally accepted minimum requirement for an acceptable tire, the search for an acceptable substitute material for channel black in the solution of the bonding problem has continued.

As will be noted below, the present invention relates to the new use of air oxidized furnace black to produce vulcanizate to metal bonding in belted tires.

The methods of producing an air oxidized furnace black are well known, for example, see U.S. Pats. 2,479,708; 3,250,634; 2,707,674; 2,707,672; 2,707,673; 3,318,720 and 3,333,979.

However, it has not, to the inventor's knowledge, been proposed in the prior art that air oxidized furnace carbon black would provide adhesion superior to channel blacks in elastomer to metal bonding systems and this fact does not appear to have been recognized by the industry.

SUMMARY OF THE INVENTION

Accordingly, it is an object of the present invention to provide a new, effective solution to the bonding problem between elastomers and metals and thereby overcome the deficiencies of the prior art as noted above.

Other objects and a fuller understanding of the invention may be had by referring to the following description and claims.

The present invention overcomes the deficiencies of the prior art attempts at a solution of the bonding problem and achieves its objectives by the use of air oxidized furnace carbon blacks to reinforce rubber vulcanizates and simultaneously produce improved adhesion of the rubber vulcanizates to metallic surfaces.

DESCRIPTION OF THE PREFERRED EMBODIMENT

The production of an air oxidized furnace carbon black may be achieved by employing the teachings of the above noted patents on the subject.

For simplicity and reproducibility the expedient of exposing a furnace carbon black to air for a predetermined at an elevated temperature has been employed in the examples below.

It has been found, as shown in the examples below, that such an air oxidized furnace carbon black when compounded in a conventional rubber formulation and vulcanized in contact with the brass surface results in a vulcanizate to metal adhesion superior to that produced by channel blacks.

In order to facilitate the understanding of the present invention, a series of examples demonstrating the superior adhesion will be set forth below. These examples are not to be construed as limiting the invention but are exemplary only.

EXAMPLE I

As a control, forty-five parts of a channel carbon black were compounded with one hundred parts of number one smoked sheets in a standard formulation containing minor parts of zinc oxide, stearic acid, pine tar, sulfur and additives; and cured at 300° F. for a period of time equal to 1.2 times the time to 90% of maximum viscosity. Test pads having dimensions of approximately 1 x 8 x ¼ inches were prepared and cured to optimum state of cure at 300° F. in contact and together with a plurality of conventional brass plated wires used in tire belts positioned transverse to the length of and between two of the test pads. These test blocks were then tested according to the ASTM "Standard Method of Testing for Adhesion of Vulcanized Rubber to Wire Cord" (D2229–68). In repeated tests the channel black produced an average adhesive force of 280 pounds and a percentage of coverage of elastomer on the wire following failure of the bond of approximately 75%.

EXAMPLE II

As a further control, Example I was repeated employing an untreated high structure, high abrasion furnace carbon black in lieu of the channel black of Example I. In repeated tests the average adhesive force produced by this bond was 250 pounds and the percentage of cover obtained was on the order of 25%.

EXAMPLE III

Example I was repeated with an air oxidized carbon black of the type described in Example II which was produced by oxidation at 300° C. for 60 minutes. Repeated tests of this bond produced an average adhesive force of 300 pounds and a percentage of coverage on the order of 90%.

This result indicates that the failure was cohesive (elastomer-elastomer) rather than adhesive (elastomer-metal).

The results of the above examples may be clearly compared in the following table:

TABLE I

| Type of black | Adhesion (pounds) | Coverage (percent) |
|---|---|---|
| Example No.: | | |
| I — Channel | 280 | 75 |
| II — Furnace | 250 | 20 |
| III — Oxidized furnace | 300 | 95 |

While the applicant does not wish to be bound by any particular theory or explanation of these unexpected results, it is believed that the strong adhesion of the air oxidized black bonds is caused by the presence of polar groups introduced on the carbon black by the process of oxidation.

Polar groups in the form of carboxyl (—COOH); quinone; hydroquinone; —SO$_3$H; —SO$_4$H; —PO$_4$H$_2$; —PO$_3$H$_2$; para-nitrophenyl and —NR$_1$R$_2$, where R$_1$ and R$_2$ may be aryl, aralkyl, alkyl, cycloalkyl or hydrogen and the like may be produced on the carbon black surface by various known processes.

In order to obtain the benefits of the present invention it is believed necessary to produce polar groups on the carbon black in excess of those present on channel black. Any method of oxidation or other processes which will produce the desired polar groups may, of course, be employed.

Other typical oxidation processes are shown, for example, in U.S. Pats. 2,686,107 (NO$_2$); 3,023,118 (HNO$_3$); 3,184,290 (HNO$_3$,NO$_2$); 3,226,244 (HNO$_3$,NO$_2$); 3,336,148 (HNO$_3$); 3,383,232 (HNO$_3$,NO$_2$,O$_3$); 3,398,009 (O$_2$,HNO$_3$,NO$_2$) and 3,353,980 (O$_2$,O$_3$).

The amount of oxidized carbon black added may, of course, vary as those skilled in the art are aware between 10 parts to over 100 parts of ozonized carbon black per 100 parts of rubber in the composition.

The present invention is thus not limited to the particular means of oxidation or quantity of addition but covers all changes and modifications of the specific method and examples of the invention herein disclosed which do not constitute departures from the spirit and scope of the claimed invention.

What is claimed is:

1. A method of producing an improved adhesive bond between rubber vulcanizates and a brass surface comprising adding at least 10 parts by weight of air oxidized furnace carbon black per 100 parts of rubber in the composition, and vulcanizing the rubber composition in the presence of sulfur while in contact with the brass surface.

References Cited

UNITED STATES PATENTS

| | | | |
|---|---|---|---|
| 2,468,239 | 4/1949 | Saulino | 117—133 X |
| 2,641,535 | 6/1953 | Cines | 260—763 X |
| 2,867,540 | 1/1959 | Harris | 106—307 |
| 3,198,690 | 8/1965 | Starke | 161—159 |
| 3,329,626 | 7/1967 | Teter et al. | 252—445 |

ROBERT F. BURNETT, Primary Examiner

R. A. DAWSON, Assistant Examiner

U.S. Cl. X.R.

106—307; 117—128.7, 133; 156—338; 161—221, 239; 260—763